Aug. 23, 1932.          H. C. PETERSON                1,873,471
                       CHRISTMAS TREE HOLDER
                       Filed July 18, 1928        2 Sheets-Sheet 2
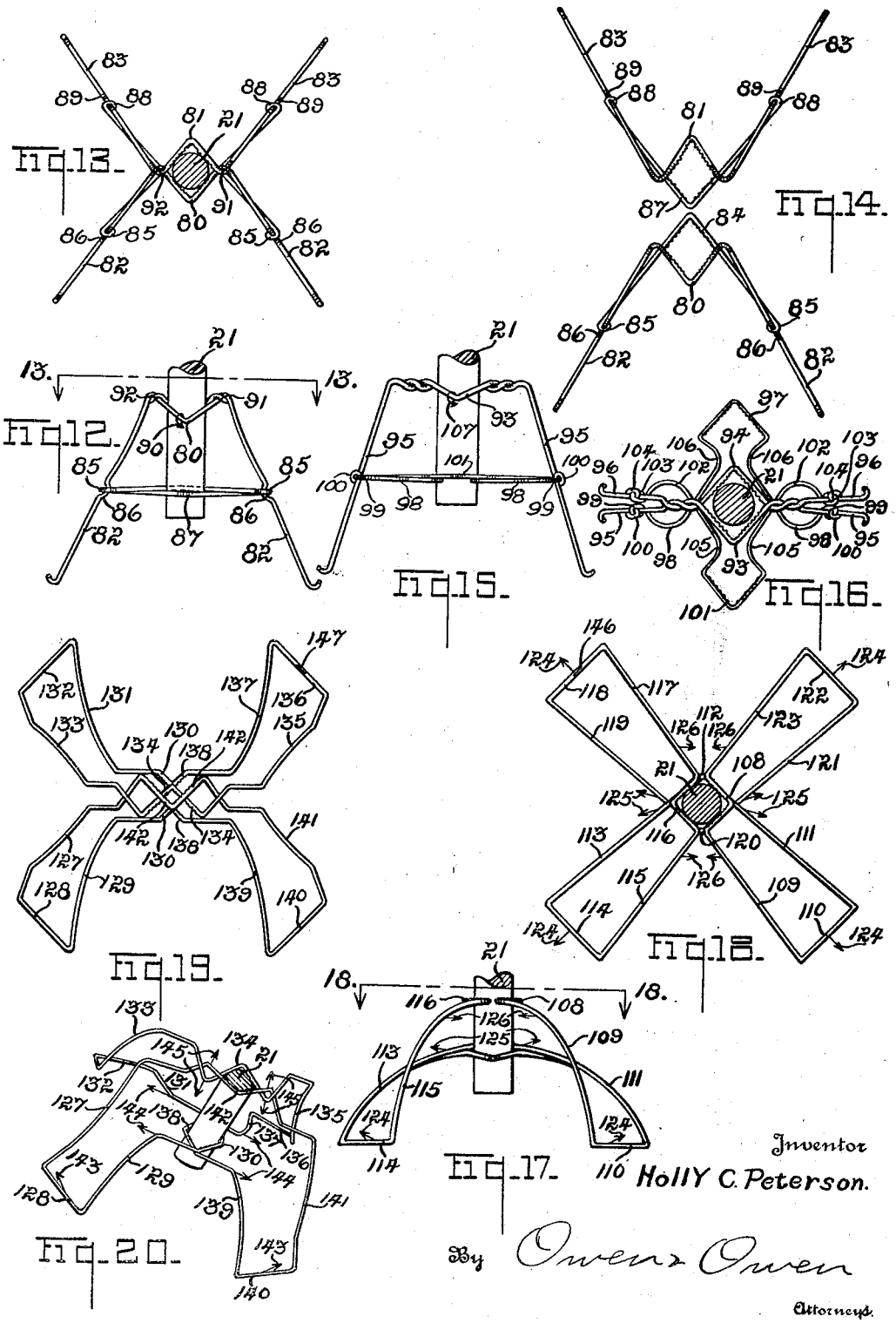
Inventor
Holly C. Peterson.
By Owen & Owen
Attorneys.

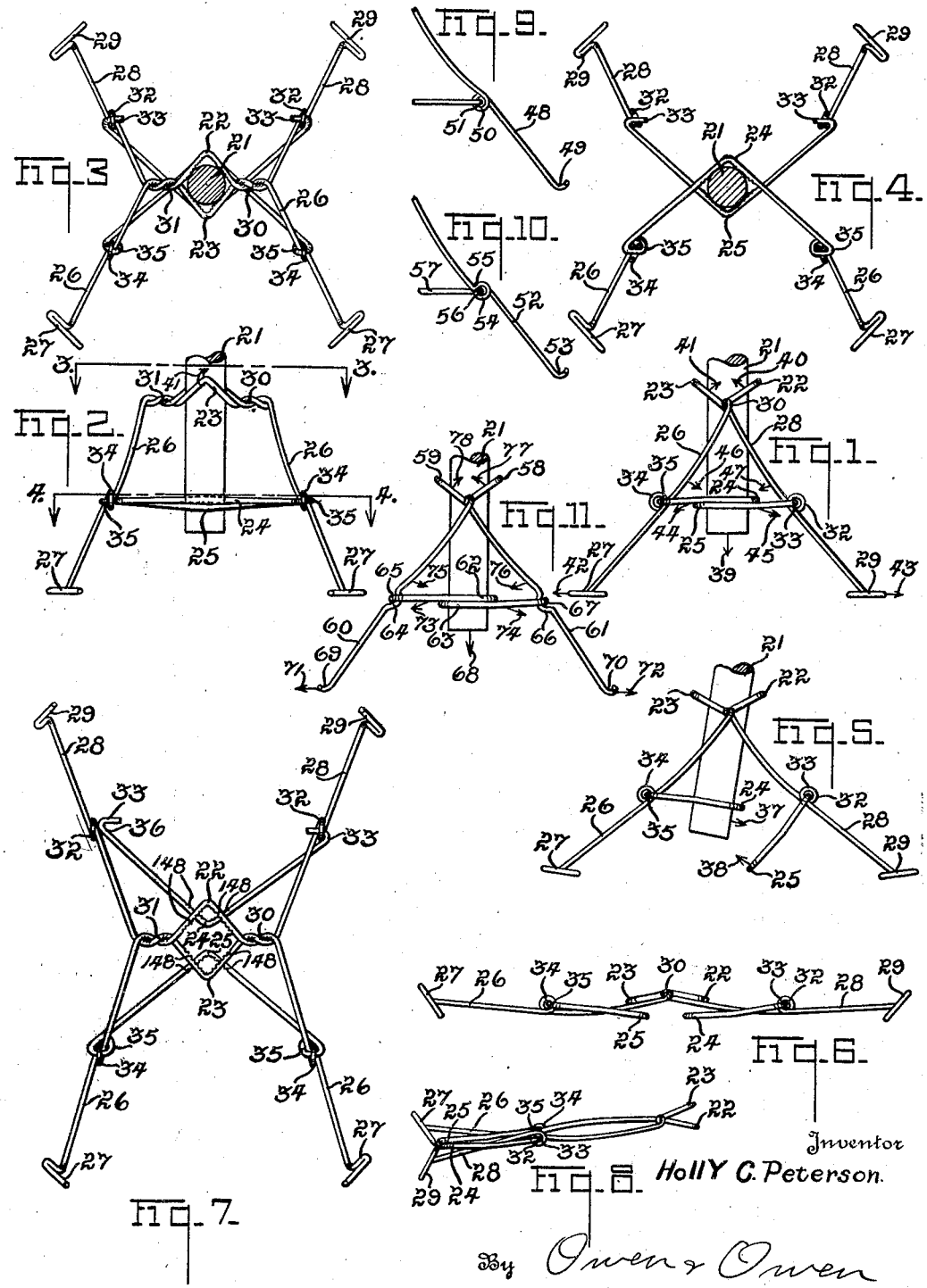

Patented Aug. 23, 1932

1,873,471

UNITED STATES PATENT OFFICE

HOLLY C. PETERSON, OF TOLEDO, OHIO

CHRISTMAS TREE HOLDER

Application filed July 18, 1928. Serial No. 293,755.

This invention relates to holders for Christmas trees and the like. An object of the invention is to provide a holder made of resilient material such as spring wire constructed so as to grip the trunk of a Christmas tree or a similar member resiliently and preferably with a grip which increases as the downward force or weight of the Christmas tree or the like is increased. A further object of the invention is to provide a holder which may be readily applied to trunks of Christmas trees or the like which vary materially in shape and diameter without other change than springing the wire or other resilient material of which the holder is made.

A further object of the invention is to provide a holder of the kind described which may be readily packed in compact form and assembled by unskilled persons for use.

Other details and objects of the invention will appear as the description proceeds.

In the accompanying drawings forming a part of this specification, Figure 1 is a side elevation of a holder embodying one form of the invention; Fig. 2 is a side elevation of the same holder viewed from the left of Fig. 1; Figs. 3 and 4 are sectional plan views on the lines 3—3 and 4—4, respectively, of Fig. 2; Fig. 5 is a diagrammatic view somewhat similar to Fig. 1, but illustrating one method of applying the holder to a tree or the like; Fig. 6 is a side elevation of the holder spread out for packing; Fig. 7 is a plan view of the holder arranged as in Fig. 6; Fig. 8 is a side view similar to Fig. 6, but showing the legs folded together to shorten the length of the packed holder when comparatively few of the holders are to be packed in a given container; Figs. 9 and 10 are detail views of alternative formations of the legs of the holder; Fig. 11 is a view similar to Fig. 1, but showing still another construction of the legs of the holder; Fig. 12 is a view similar to Fig. 2, but showing a different form of holder; Fig. 13 is a sectional plan on the line 13—13 of Fig. 12; Fig. 14 is a plan of the holder shown in Figs. 12 and 13, with the members thereof separated; Fig. 15 is a side elevation similar to Figs. 2 and 12, but showing a different embodiment of the invention; Fig. 16 is a plan view of the holder shown in Fig. 15, with the legs of the holder brought together; Fig. 17 is a side elevation similar to Figs. 2, 12 and 15, but showing another embodiment of the invention; Fig. 18 is a sectional plan on the line 18—18 of Fig. 17; Fig. 19 is a plan view of a modification of the holder shown in Figs. 17 and 18, as it appears when not in use; Fig. 20 is a perspective view of the holder shown in Fig. 19, when in use.

In the drawings, the holder is shown throughout as being made of spring wire. It will be understood without further statement to that effect that portions of the device may be made of other resilient material, or of rigid construction in the portions where resiliency is not needed.

In the form of holder shown in Fig. 1, there is indicated a cylindrical member 21, which may be the trunk of a Christmas tree or the like, and which is gripped between upper holding jaws 22 and 23 and lower holding jaws 24 and 25. Jaw 22 is provided with legs 26 supported by feet 27, while jaw 23 is connected to legs 28 supported on feet 29. The jaws, with their respective legs, are made by properly bending pieces of wire, the wire forming jaw 22 with its legs being bent about the wire forming jaw 23 and its legs at points 30 and 31 to form, in effect, hinges between the two jaws 22 and 23. Legs 28 of jaw 23 are provided with eyes 32 into which there are hooked the ends 33 of jaw 25, while legs 26 of jaw 22 are provided with eyes 34 into which are hooked the ends 35 of jaw 24. In the construction herein shown, ends 35 of jaw 24 are bent around so that they can not be removed from eyes 34 without straightening, while hooked ends 33 are left so that they may be released from eyes 32 by merely spreading apart the ends 33.

It will be readily understood that the holder thus far described may be spread apart by separating feet 27 and feet 29 as far as possible, thereby straightening hinges 30 and 31, as shown in Figs. 6 and 7. When in this shape, the holders may be readily packed flat so that they do not take up excessive room. If desired, one end 33 of jaw 24 may be left unhooked, as indicated at 36 on Fig. 7, for purposes which will be described later.

If but few of the holders are to be placed in a container, it is sometimes preferable to fold the feet 27 over against feet 29, as indicated in Fig. 8, thereby bending the hinges 30 and 31 and materially lessening the length of the holder for packing. However, the holder is not as easily placed in this position without springing portions thereof as it is in the spread apart position, in which it is shown in Figs. 6 and 7.

When the holder is to be applied to a tree, the trunk 21 of the tree may be slid between jaws 22 and 23 with the bottom end within the loop of jaw 24 and thereafter the feet of the holder may be forced together and jaw 25 placed about the tree and its free end hooked into loop 32 of leg 28. If preferred, both jaws 24 and 25 may remain hooked to their respective legs, and the tree may be placed between jaws 22 and 23, and then one of the jaws, as 24, placed in the position in which it is shown in Fig. 5. Thereafter, the bottom of the tree may be moved in the direction indicated by arrow 37, after which jaw 25 is moved upward in the direction shown by arrow 38, so as to enclose the bottom of the tree and bring the holder into the position in which it is shown in Fig. 1. Thereafter, the weight of the tree is allowed to rest upon the holder and presses downward to the direction indicated by arrow 39 in Fig. 1.

The result of the exertion of weight by the tree is a tendency to press downward upon both pairs of jaws. The parts are bent so that when placed in the position in which they are shown in Fig. 1, jaws 22 and 23 are pressing inward resiliently in the direction shown by arrows 40 and 41 and even before any weight is placed upon the device, this pressure of the jaws tends to separate feet 27 from feet 29 in the direction indicated by arrows 42 and 43 and thereby exerts pull upon jaws 24 and 25 in the direction indicated by arrows 44 and 45, respectively. When pressure is exerted upon the holder, there is a tendency to spring the legs and force feet 27 and 29 farther apart. As the legs are held against spreading at eyes 32 and 34 by their connection with jaws 24 and 25, these eyes act as fulcrums and the spreading apart of feet 27 and 29 tends to bend inward the portion of the legs above the eyes in the direction indicated by arrows 46 and 47. This puts additional pressure upon jaws 22 and 23 in the direction of arrows 40 and 41. It will readily be seen, therefore, that the greater the weight which the holder is called upon to support, the more force is exerted towards separating feet 27 and 29, which in turn exert stronger pull on jaws 24 and 25 against the trunk of the tree and exerts greater pressure of jaws 22 and 23 against the trunk of the tree. Therefore, both pairs of jaws are tightened increasingly as the weight to which they are subjected is increased.

In Fig. 9 there is shown the detail of a leg which may be substituted for the construction of legs 26 or 28. In this figure, there is shown a leg 48 with a foot 49 of somewhat simpler construction than feet 27 and 29, and with a loop 50 on the inside of the leg for receiving a hook 51 on the end of the respective jaw. The principal difference between this construction and that shown in Figs. 1 to 8, is the placing of the loop on the inside of the leg instead of the outside.

Fig. 10 shows another modification of a leg, wherein leg 52 provided with a foot 53 is constructed with a loop 54 which is carried around, as shown at 55, so as to provide a kink coming down on the inside of the hook 56 on the end of a jaw 57. It will be noted in this construction that the lower portion of leg 52 comes up outside of hook 56, while the upper portion of the leg unites with portion 55 at the inside of hook 56. This construction is somewhat more complicated to form, but has the advantage that when weight is placed upon the upper end of the leg, it tends to press downward the end of loop 55 so as to tighten the loop about end 56, whereas in the forms shown in Figs. 1 and 9, weight supported by the upper end of the leg tends to open up the loop about the hook on the end of the jaw.

In the construction shown in Fig. 11, there is a holder comprising jaws 58 and 59 similar to jaws 22 and 23. Jaws 58 and 59 are supported upon legs 60 and 61, respectively. Jaws 62 and 63 are provided similar to jaws 24 and 25. Bends 64 are provided in leg 60 for receiving ends 65 of jaw 62, while similar bends 66 are provided in legs 61 for receiving ends 67 of jaw 63. When the trunk 21 of the Christmas tree or the like is supported in this holder, it forces pressure downward in the direction of arrow 68, which tends to spread apart feet 69 of legs 60 from feet 70 of leg 61 in the direction indicated by arrows 71 and 72. This tends to pull apart jaws 62 and 63 in the direction indicated by arrows 73 and 74, but as the jaws cannot move in this direction without biting into the body of the tree, the connection of the jaws to the legs forms, in effect, fulcrums so that the upper ends of the legs tend to bend inward in the direction indicated by arrows 75 and 76. This tends to bend jaws 58 and 59 about their hinge connections in the direction indicated by arrows 77 and 78, respectively. It will be readily seen that this construction operates substantially in the same way as that shown in Fig. 1, except that there is a different form of connection between the lower jaws and the legs.

In Figs. 12, 13 and 14, another modification of the holder is shown. In this construction there are provided upper jaws 80 and 81 connected respectively to legs 82 and 83. It will be noted that in this instance the upper jaw is on the same side of the tree with the legs which are connected thereto and that the jaw is beneath the hinge connections 91 and 92 of the two jaws, instead of above such hinge connection, as in Figs. 1 to 11. A lower jaw 84 has hooked ends 85 connected to bends 86 in legs 82 and a similar jaw 87 has ends 88 connected to bends 89 in legs 83. It will be readily understood that when weight is placed upon the holder by the body of a tree 21 or the like, the feet tend to spread in the same manner described in connection with the construction shown in Figs. 1 to 11, and thereby pull the lower jaws against the trunk of the tree. The movement about the connections on the lower jaws as a fulcrum tends to turn the upper jaws on their hinge connections the same as in the construction shown in Figs. 1 to 11, except that the jaws are on the same side with the legs and bend inward instead of upon the opposite side and bend upward, and consequently the force which tends to bend them about their hinges tends to move them downward and inward instead of upward and inward. This is in the same direction as the weight of the tree tends to move the jaws, and, therefore, the grip of the jaws in this form is to that extent more positive than in the form shown in Figs. 1 to 11. It will be readily understood that in this form, both the bending of the legs and the weight of the tree on the jaws tends to move the jaws in the direction indicated by arrow 90. Nevertheless, for ordinary purposes, the form of device shown in Figs. 1 to 11 grips the article held with sufficient certainty.

Another distinction between the construction shown in Figs. 1 to 11 and that shown in Figs. 12 to 14, is that the two parts of the device shown in Figs. 12 to 14 may be readily separated in the manner indicated in Fig. 14. They are connected merely by hooking jaw 81 over jaw 80, as will be readily seen by comparison of Figs. 13 and 14. This separability of the members is a convenience in packing the holders, but is an inconvenience in assembling. For this reason, it depends upon circumstances which form is upon the whole preferable.

Figs. 15 and 16 show another form of holder. In this construction there are upper jaws 93 and 94, similar to jaws 80 and 81. These jaws are supported by legs 95 and 96, similar to legs 82 and 83. A lower jaw 97 is connected by loops 98 and hooked ends 99 to eyes 100 of legs 95, and a lower jaw 101 is connected through loops 102 and hooked ends 103 with eyes 104 in legs 96. As will be seen from Fig. 16, the two sides of jaw 101 are bent towards each other at 105 between the jaw and loops 102, and similarly, the sides of jaw 97 are bent together between the point of the jaw and loops 98.

It will be readily understood that in this form of device, when the legs are brought together, as shown in Fig. 16, jaws 93 and 94 are raised and thereby spread apart and, of course, jaws 97 and 101 are spread apart to the position in which they are shown in Fig. 16. The holder may then be placed over the body of the tree, as indicated in Fig. 16, and thereafter the legs are spread apart until the narrow portions 105 and 106 of the lower jaws pass the body of the tree, whereupon the spring pressure of these narrowed portions is sufficient to hold the legs in this spread apart condition and to hold the upper jaws against the body of the tree. When the weight of the tree is placed upon the holder, the feet tend to spread apart in the way previously described, but the loops 98 and 102 yield sufficiently so that while the outward movement of the feet places extra pressure upon the lower jaws, the middle portion of the legs is not prevented from moving outward, and consequently the legs act as levers moving about the hinge connections as fulcrums instead of about their connections with the lower jaws. As a result, this spreading apart of the legs continues to tend to move jaws 93 and 94 downwardly and, therefore, to grip the tree tighter. The advantage of this form of holder is that it may be very easily slipped onto the tree while the tree is in horizontal position and when the legs are spread apart, the resiliency of bends 105 and 106 holds the holder in place until the tree is set thereon, whereupon the weight of the tree tightens the jaws in accordance with the necessity of the situation. Such a holder is capable of a wider range of adjustment than the form shown in Figs. 1 to 14, and is, therefore, advantageous for some uses.

Figs. 17 and 18 show another form of holder, which may be made by properly bending one continuous length of spring wire. Beginning at upper jaw 108, the wire runs down through leg 109 to foot 110, then up leg 111 to lower jaw 112. Lower jaw 112 passes partly around the tree and then leg 113 extends downward to foot 114. From the other end of foot 114, leg 115 extends upward to one end of upper jaw 116, from the other end of which jaw leg 117 extends downward to foot 118. From the other end of foot 118 leg 119 extends upward to the other lower jaw 120 and from the other end of jaw 120 leg 121 extends down to foot 122. The construction is completed by leg 123 which extends upward from the foot 122 to jaw 108.

It will be readily seen that when the weight of a Christmas tree or the like is exerted upon the holder shown in Figs. 17 and 18, the feet tend to move upward and outward with respect to the trunk of the tree, as indicated by arrows 124. The outward movement of the feet pulls upon legs 111, 113, 119 and 121 in the direction indicated by arrows 125. At the same time, the downward movement of the tree with respect to the feet, or the upward movement of the feet with respect to the trunk of the tree tends to force the upper jaws inward, the force on legs 109, 115, 117 and 123 being indicated roughly by arrows 126. It will be readily seen that the resiliency of the wire permits the easy application of a holder, such as shown in Fig. 17 or 18, to the trunk of a tree and that subsequent exertion of pressure by the trunk of a tree results in tightening the jaws of the holder about the tree so that the tree is held resiliently but securely in the holder.

Figs. 19 and 20 show a modification of the type of holder shown in Figs. 17 and 18. In this construction also, the holder is formed from one continuous length of resilient wire. Beginning with leg 127, connected to foot 128, there extends from the other end of foot 128 a leg 129 reaching to one end of lower jaw 130. From the other end of lower jaw 130 there extends a leg 131 to one end of a foot 132, from the other end of which there rises a leg 133 reaching to upper jaw 134. From the other end of jaw 134 there extends a leg 135 to foot 136 from which leg 137 rises to the other lower jaw 138. From the other end of lower jaw 138 there extends a leg 139 to foot 140 from which rises leg 141 to upper jaw 142, which is also connected to leg 127.

It will be readily seen that when this holder is subjected to the weight of a Christmas tree 21 or the like, held between the jaws thereof, there is a tendency for the feet to move outward and upward with respect to the tree in the direction of arrows 143, whereupon the outward movement tends to spread apart the lower jaws in the direction of arrows 144, while the upward movement tends to press together the upper jaws in the direction of arrows 145. This holder operates substantially in the same manner as that disclosed in Figs. 17 and 18, except that there are extra bends provided in the legs so that a more resilient action results. This enables the holder to be applied more easily to widely differing sizes of tree trunks or the like and insures sufficient resilient pressure in all cases to securely hold the weight of the tree.

The endless resilient member for constructing the holders shown in Figs. 17 to 20, may be formed in any convenient way, but there is indicated a joint between the two ends of the wire at 146 on Fig. 18 and at 147 on Fig. 19.

The wire may be left smooth throughout its length, but, if desired, the portion of the wire forming jaws may be roughened or indented so as to form teeth, indicated at 148 on Fig. 7. Similar teeth are shown in some of the other figures, but it will be readily understood that this roughening of the wire may be used or omitted, as desired.

It will be seen that a number of forms of holders have been described, but that they all have certain characteristics in common. In each instance, the initial gripping of the jaws is caused by the resiliency of the holder itself. In each instance, there are upper jaws and lower jaws so as to maintain the article held in proper vertical position. In each instance, the weight of the article held tends to increase the grip on the article of both the lower jaws and the upper jaws. In each instance, there is shown a simple holder formed essentially of spring wire and depending upon the resiliency of its parts to place sufficient initial pressure on the jaws to maintain the holder in position on the article held and so constructed as to increase the gripping effect of the jaws as the weight exerted on the holder is increased.

When the flexing of the wire is increased by increased weight of a tree in the holder, the resistance of the wire to further flexing increases. This has the effect of making the holder more rigid as the weight it sustains is increased, so that in all instances the tree is held somewhat resiliently, so as to allow oscillation thereof, and the resistance to oscillation, as well as the resistance to downward movement, varies automatically with the weight of the tree. This is another feature common to the various forms disclosed.

While portions of the device may be made rigid, as stated above, and retain some of the advantages of the invention, there are advantages in a construction which may be made entirely of spring wire, and especially that may be made throughout of wire of the same size, and the various forms shown share this advantage.

In the construction shown in Figs. 1 to 14, inclusive, the legs are adapted to act as levers moving about their connections with the lower jaws as fulcrums, for exerting pressure upon the upper jaws, the upper portions of the legs being bent to accomplish this result. As will be seen from Figs. 3, 4 and 13, the arms of the lower jaws are nearly enough in line between the tree and the legs so that the spreading force of the legs is substantially endwise of said arms.

While not absolutely necessary in all instances, it is desirable to have the upper ends of the legs, between the hinge connections of the upper jaws and the connections to the lower jaws, either straight or bent slightly inward so that the weight of the tree exerted by the upper jaws tends to bend the upper portion of the leg in the same way in which the spreading of the feet tends to bend it. If the upper ends of the legs bend outward to any material degree, it might be necessary to turn the upper jaws in the opposite direction, as pressure exerted by the tree upon the upper jaws and transmitted to the upper ends of the legs might tend to bend these legs in the opposite direction from that in which they would normally be bent by the spreading of the feet.

For convenience in avoiding circumlocution, the article held is referred to in the claims as a Christmas tree, but it will be readily understood that the holder may be employed for holding other articles without changing the character of the holder, and that the term Christmas tree holder is intended to indicate merely that the holder is intended to be closed upon a roughly cylindrical or prismatic body and hold it as a Christmas tree is held by its trunk.

While numerous modifications have been disclosed, it will be readily understood that other changes in the minor features of the holder may be made without departing from the scope of the appended claims.

What I claim is:

1. In a Christmas tree holder, two pairs of jaws adapted to grip the trunk of a tree, one above the other, and resilient means for supporting the jaws and tree and resisting their lateral movement with oscillations of the tree, whereby said means is flexed by the weight of the tree and offers resistance to said oscillation varying directly with the weight of the tree supported by the jaws.

2. A Christmas tree holder comprising two pairs of jaws adapted to grip the tree, one above the other, and means constantly tending to close both pairs of jaws upon a tree placed in the holder.

3. A holder for a Christmas tree constructed of spring wire of substantially uniform size, portions of the wire being bent to form jaws and portions of the wire being bent to form legs, the bottoms of legs being free to spread apart and the tops of the legs being connected to the jaws and, when spread apart, resiliently holding the jaws against the trunk of a tree placed therein.

4. A Christmas tree holder constructed of spring wire of substantially uniform size, portions of said wire forming jaws and portions of said wire forming legs supporting the jaws and tree and said legs spreading downwardly and outwardly and their bottoms being free to move independently and, when spread, resiliently holding the jaws against lateral movement with respect to the axis of a tree held therein.

5. A Christmas tree holder formed of spring wire, portions of said wire forming two pairs of jaws adapted to grip the trunk of a tree one above the other and portions of said wire forming legs supporting said jaws and resiliently closing both pairs of jaws upon the trunk of a tree placed therebetween.

6. A Christmas tree holder formed of spring wire, portions of said wire forming two pairs of jaws adapted to grip the trunk of a Christmas tree, one above the other, and portions of said wire forming legs connected to both pairs of jaws and resiliently supporting and closing said jaws upon a tree placed therebetween and holding the pairs of jaws in vertical alinement, whereby the force with which the legs close the jaws and hold them in alinement varies directly with the downward pressure of the jaws upon the legs.

7. A Christmas tree holder formed of spring wire, portions of said wire forming two sets of jaws adapted to grip the trunk of a Christmas tree, one set above the other, and portions of said wire forming legs, said legs being connected to the jaws and extending downward and outward therefrom, the lower ends of the legs being separate and free to move apart except for their connection to the jaws, which connection tends to resiliently close the jaws as the legs are spread apart.

8. A Christmas tree holder formed of spring wire and comprising two loops roughly U-shaped and bent over each other at points adjacent their middle portions so as to form in effect hinges where they cross each other with jaws between said hinges and legs extending from said hinges, and two loops having their ends connected to said legs and their middle portions adapted to form jaws embracing the trunk of a tree below the first said jaws.

9. A Christmas tree holder formed of spring wire and comprising two loops roughly U-shaped and bent over each other at points adjacent their middle portions so as to form in effect hinges where they cross each other with jaws between said hinges and legs extending from said hinges, and two loops having their ends connected to said legs and their middle portions adapted to form jaws embracing the trunk of a tree below the first said jaws, the joints in said wire being bent to permit the holder to be folded flat when not in use, and the first said jaws being connected to legs at such an angle that when the trunk of the tree is placed between both sets of jaws, drawing together of the legs by the lower set of jaws to place them on opposite sides of a tree moves the upper jaws toward each other.

10. A Christmas tree holder formed of spring wire of substantially uniform size and comprising four loops of wire, each roughly U-shape, two of said loops being longer than the others and being twisted over each other at points adjacent the middle and having their middle portions bent to form jaws whereby the portions bent over each other form in effect hinges and the ends of the loops form legs, the angle of the legs to the jaw portions being such that when the legs are moved towards each other they tend to close the jaws, the shorter loops having their ends attached to the respective leg portions of the longer loops and being of such length that in order to enclose between them the trunk of a tree, they must draw the legs together sufficiently to exert resilient closing pressure of the upper jaws against the trunk placed therebetween.

In testimony whereof I have hereunto signed my name to this specification.

HOLLY C. PETERSON.